United States Patent [19]

Nowak

[11] Patent Number: 5,580,188
[45] Date of Patent: Dec. 3, 1996

[54] METHOD FOR REPLACING BURIED PIPE

[75] Inventor: John G. Nowak, Goddard, Kans.

[73] Assignee: Nowak Construction Co., Inc., Goddard, Kans.

[21] Appl. No.: 503,272

[22] Filed: Jul. 17, 1995

[51] Int. Cl.[6] .................................................. F16L 1/00
[52] U.S. Cl. ........................ 405/184; 405/154; 405/156
[58] Field of Search .................................. 405/154, 156, 405/184, 157; 175/53, 62; 166/55–55.7; 15/104.2, 104.7, 104.13, 104.15, 104.16

[56] References Cited

U.S. PATENT DOCUMENTS

| | | | |
|---|---|---|---|
| 4,507,019 | 3/1985 | Thompson | 405/154 |
| 4,911,579 | 3/1990 | Lutz et al. | 405/154 X |
| 4,915,543 | 4/1990 | Akesaka | 405/154 X |
| 4,925,344 | 5/1990 | Peres | 405/154 X |
| 5,098,225 | 3/1992 | Rockower et al. | 405/184 X |
| 5,403,122 | 4/1995 | Granella | 405/154 X |

*Primary Examiner*—Dennis L. Taylor
*Attorney, Agent, or Firm*—Kenneth H. Jack

[57] ABSTRACT

A method of replacing an existing buried pipe with a replacement pipe comprising the steps of positioning a drilling unit of the type typically used with directional boring systems, at ground level over the pipe to be replaced, operating the drilling unit to drive and guide a hollow flexible drill stem through the earth and into an open end of the section of existing pipe to be replaced, further operating the drilling unit to extend the drill stem through the section of existing pipe to be replaced and to protrude from its other end, attaching to the leading end of the drill stem a conical back reaming bit, attaching to the trailing end of the back reaming bit a flexible replacement pipe, and operating the drilling unit drill to apply a pulling force to the drill stem and to apply rotational torque to the drill stem, causing the back reaming bit to be driven and rotated laterally into and through the existing pipe, grinding away the existing pipe, and causing the replacement pipe to be simultaneously pulled into and through the pipe channel.

9 Claims, 4 Drawing Sheets

METHOD FOR REPLACING BURIED PIPE

FIELD OF THE INVENTION

This invention generally relates to a method for replacement of a buried pipe without extraction of the pipe through means of surface excavation. More particularly, the invention concerns a method for grinding an existing buried pipe which is in need of replacement into a pulverized debris which is driven and washed through the interior channel of the existing pipe by a fluid lubricant. Grinding of the existing pipe may occur simultaneously with installation of a replacement pipe whose diameter may be larger than the diameter of the existing pipe. More specifically, the present invention relates to a method of applying a pulling force and rotational torque to a back reaming bit by means of a flexible hollow drill stem connected thereto and located within and through the existing pipe; the torque and pulling force being provided by a drilling unit of the type typically used with directional boring systems, the drilling unit preferably being located at ground level. The pulling force provided by the drilling unit pulls the back reaming bit and attached replacement pipe laterally through the channel of the existing pipe. The rotational torque applied by the drilling unit to the drill stem rotates the back reaming bit, grinding the existing pipe into a pulverized debris.

BACKGROUND OF THE INVENTION

The present invention is, in general, applicable to replacement of clay tile sewer pipes, concrete pipes, plastic pipes and metal pipes. However, for illustrative purposes, the invention is discussed herein as it applies to replacement of a clay tile sewer pipe.

A typical clay tile sewer pipe is sectioned, each section having an enlarged bell at one end and a tapered portion at the other end. Sections of clay sewer pipe are placed end to end, with the tapered end of each section fitting into the bell end of the proceeding pipe section.

Clay sewer pipes deteriorate over time. Shifting of the ground causes cracking of clay sewer pipes, and tree roots growing into pipe fissures cause further cracking. Settling of the ground may cause pipe joints to pull apart. Clay sewer pipes which become disjointed or which become cracked lose their function and are necessarily replaced. It is, therefore, desirable to provide a means for replacement of clay sewer pipes.

A typical method of replacement of clay sewer pipes comprises the steps of excavation of a trench over the length of the pipe to be replaced, exposing the pipe; extracting the pipe, and replacing the pipe with a new sewer pipe. However, streets, structures, and utility lines lying over a sewer pipe in need of replacement often make excavation of the pipe impracticable. It is, therefore, desirable to provide a means of sewer pipe replacement which does not require disturbance of structures and utilities lying over the pipe to be replaced.

A method of replacing a deteriorated existing sewer pipe without disturbing overlying structures is to slide a flexible plastic replacement pipe through the channel of the existing pipe. However, such methods results in utilization of a replacement pipe whose cross sectional area is substantially less than that of the existing pipe, resulting in reduced carrying capacity. Often it is desirable or necessary to increase, rather than reduce, the carrying capacity of the existing pipe. An increased carrying capacity requires that the diameter of the replacement pipe be greater than the diameter of the existing pipe. It is, therefore, desirable to provide a method for replacing an existing clay sewer pipe with a replacement pipe whose diameter is greater than that of the existing pipe, and without disturbing overlying structures.

It is known that clay sewer pipes may be replaced in situ by means of a driving or pulling machine, such as a pneumatic hammer or a hydraulic ram; such machine being axially aligned with an end of the existing pipe. Axial alignment of such machines requires excavation of a pit at an end of the existing pipe for sub-ground level installation and operation of the machine. The process of excavating a pit at an end of the pipe to be replaced, lowering a machine such as a hydraulic ram or pneumatic hammer into the pit, installation of the machine for operation, removing the machine, and closing the pit after pipe replacement, is an expensive, time consuming and labor intensive process. The process also involves personal safety hazards. Below ground operation of a pneumatic hammer or hydraulic ram exposes the machine operator to a risk of cave in of the walls of the pit. Also, in many instances, ground water will flow into a pit dug for operation of a hammer drill or hydraulic ram, creating a need for dewatering operations. It is, therefore, desirable to provide a pipe replacement system wherein power driven equipment utilized in the process is located above ground.

THE PRIOR ART

U.S. Pat. No. 4,925,344 issued to Peres Deceased, et al., and U.S. Pat. No. 4,507,019 issued to Thompson are exemplary of the prior art. Neither the Perez Patent nor the Thompson Patent disclose or teach the novel and beneficial steps and processes of the present invention.

In Peres, a pit is dug so that a pipe expanding and jacking machine may be placed below ground level in axial alignment with the existing pipe being replaced. The pipe expanding and jacking machine, through a hollow drill stem, supplies a pushing force, and applies rotational torque to a fluted drill head, which is axially aligned with the pipe to be replaced. Simultaneously with grinding of the existing pipe, sections of a replacement pipe are extended into the channel behind the grinding head. The pipe expanding and jacking machine is mounted on tracks to provide for forward jacking in incremental lengths and to provide for backward motion to receive successive replacement pipe sections.

The method of the Thompson patent is similar to Peres in that a boring and jacking machine is positioned below ground level on tracks in a pit in axial alignment with the existing pipe to be replaced. Instead of grinding the existing pipe through use of a grinding head, the Thompson method utilizes a conical pipe expanding section, which is rotated and either driven or pulled through the channel of the existing pipe by the boring and jacking machine. Passage of the pipe expanding section through the existing pipe fractures the existing pipe allowing the channel thereof to be expanded.

SUMMARY OF THE INVENTION

A feature of the invention described herein is to provide a novel method for replacement of sewer pipes or other types of utility pipes, wherein an existing in ground pipe is ground and pulverized in place by means of a flexible hollow drill stem located within and through the channel of the existing pipe; the drill stem being rotated and pulled by a drilling unit of the type typically used with directional boring systems, which drilling unit is mounted at ground level; and the drill stem having attached at its opposite end a back reaming bit. Torque and pulling force applied by the drilling unit to the drill stem imparts rotational and lateral motion to the back reaming bit through the channel of the existing pipe, grinding, pulverizing, and removing the existing pipe, and simultaneously pulling into place a replacement pipe.

It is also a feature of the invention described herein to provide a novel method for in ground pipe replacement which permits replacement of the existing pipe with a replacement pipe having a diameter equal to or larger than the diameter of the existing pipe.

It is a further feature of this invention to provide a novel method for in ground pipe replacement wherein structures, roads and in ground utilities lying over the existing pipe remain undisturbed.

It is another feature of the present invention to provide a novel method for in ground pipe replacement wherein excavation for below ground level installation and operation of power driven machinery is not required.

It is another and further feature of this invention to provide a novel method for in ground pipe replacement wherein substantially all matter and material making up the existing pipe is pulverized, driven, and washed along the channel of the existing pipe, and thereby is removed from the channel.

It is another feature of this invention to provide a novel method for in ground pipe replacement wherein the grade or slope of the existing pipe is preserved and matched by the replacement pipe.

It is a further feature of this invention to allow pipe replacement operations to be conduced within a manhole, avoiding the need of a drill stem insertion pit.

Further or other objects and beneficial attributes of the invention described herein will be apparent to those skilled in the art upon familiarization of the disclosure herein. The form of the invention herein described is illustrative of the function of the invention in general. The details of this disclosure are not to be construed as limiting the scope of the present invention.

The novel aspects of this invention are accomplished through a back reaming and replacement pipe pulling operation that occurs in one or more passes through the channel of an existing pipe which pipe is in need of replacement. To accomplish this, a pit is excavated at both ends of the section of the existing pipe to be replaced. One end of the section of the existing pipe serves the purpose of insertion of the replacement pipe and the other end serves the purpose of drill stem insertion. Where the existing pipe is sloped, it is preferable that the lower end of the existing pipe serve as the drill stem insertion end. Often a pipe maintenance manhole will be located at an end of the section of pipe to be replaced. When a manhole is present, the manhole may take the place of the drill stem insertion pit.

The existing pipe exposed at the bottom of the pits, or pit and manhole as the case may be, is fractured or cut, and a section thereof is removed allowing for respective insertions of the replacement pipe and the drill stem. The wall of the replacement pipe insertion pit which faces the exposed opening of the existing pipe is sloped away from the opening, allowing a replacement pipe lying at ground level to be flexibly bent and pulled downward into the pit.

With the pit or pits excavated, a drilling unit of the type typically used with directional boring system, is located at ground level above the existing pipe at a point laterally and outwardly removed from the drill stem insertion end of the existing pipe so that the angle between the ground level and a line extending from the drilling unit to the drill stem insertion and is approximately 30°. The drilling unit is preferably of a type capable of simultaneously applying rotational torque and a pulling or pushing force to a successively jointed hollow drill stem, and is further capable of performing a fluid assist wherein a fluid is simultaneously pumped by the drilling unit into and through the hollow channel of the drill stem. The drill stem preferably is capable of electronic guidance through the soil by a steering means such as a steering bit guided by an electronic sensing and steering module affixed to the leading end thereof.

With the drilling unit so located, a steering bit and electronic guidance module is affixed to the end of the drill stem and the bit and the drill stem are driven and guided along a path into and through the earth by the drilling unit. Preferably, the path of the drill stem is an upwardly concave arc extending from the drilling unit through the earth toward the existing pipe. Such arced passage is guided to cause the end of the drill stem to come into close proximity with the existing pipe and to cause said end to be substantially parallel with the existing pipe. The steering bit is then further driven and guided substantially parallel with the existing pipe until it protrudes from the wall of the drill stem insertion pit. Where a manhole takes the place of the drill stem insertion pit, an aperture is broken or cut through the wall of the manhole to allow for passage of the steering bit into the manhole space.

After the steering bit and guidance module of the drill stem protrude from the wall of the drill stem insertion pit or manhole, as the case may be, the bit and module are removed. The end of the drill stem is then plugged, and the drill stem is further extended and guided to enter the exposed opening of the existing pipe. The drill stem is then further extended through the length of the section of existing pipe to be replaced until the end of the drill stem protrudes into the replacement pipe insertion pit. There, the plug is removed from the end of the drill stem.

A back reaming bit whose outside diameter is greater than the outside diameter of the replacement pipe is then fixedly attached to the end of the drill stem. The back reaming bit preferably is conical and has a helical cutting blade fixedly attached to its outer surface. The back reaming bit also preferably has a hollow interior chamber which, when the bit is attached to the drill stem, forms a continuous passage for the flow of fluid from the interior channel of the drill stem into the chamber. The back reaming bit also preferably has a plurality of apertures forming passages from the interior chamber to the exterior surface of the back reaming bit. The back reaming bit also preferably has a swivel connecting means fixedly such as a rotatable eye fixedly attached to its trailing end for towing a replacement pipe without rotating the replacement pipe.

After the back reaming bit is attached to the drill stem, the end of a flexible replacement pipe is pulled downward into the replacement pipe insertion pit for attachment to the back reaming bit. To facilitate such attachment, the replacement pipe is plugged, the plug having and attaching means such as a clevice. The attaching means of the plug is aligned with the swivel connecting means of the back reaming bit, and the back reaming bit is fixedly and rotatably attached to the replacement pipe by means such as a pin inserted through the clevice and eye.

With the mechanically connected sequence of the replacement pipe, the back reaming bit, the drill stem located within and through the existing pipe, and the drilling unit in place, the back reaming and replacement pipe installation operation commences. The drilling unit is operated to simultaneously apply a pulling force and rotational torque to the drill stem, causing the back reaming bit to rotate about the axis of the drill stem, and causing the back reaming bit to move laterally into and through the channel of the existing pipe, toward its drill stem insertion end. Said lateral motion causes the helical blade of the back reaming bit to come into contact with the existing pipe. Upon such contact, grinding and pulverization of the existing pipe takes place. Grinding of the existing pipe progresses at a rate of 100 feet to 200 feet per hour.

While the existing pipe is being ground away the drilling unit is operated to perform a fluid assist. In the fluid assist, a fluid composed of water and a polymer lubricant mixed a ratio of approximately one-half gallon of polymer to 500 gallons of water is pumped into the interior channel of the drill stem, causing the fluid to flow through the drill stem into the hollow internal chamber of the back reaming bit, and causing the fluid to emit from the apertures in the back reaming bit. The fluid lubricates the helical blade of the back reaming bit as it grinds the existing pipe. The fluid also lubricates the wall of the channel rearward of the back reaming bit reducing friction between channel and the replacement pipe. The fluid also causes pulverized debris from the existing pipe and surrounding ground to flow along the channel of the existing pipe toward the drill stem insertion pit or manhole, as the case may be. If the ground surrounding the existing pipe is sandy or composed of loosely compacted soil, the fluid pumped through the drill stem may further comprise bentonite mixed at a rate of approximately 100 lbs. per 500 gallons of water. A bentonite fluid mixture serves the additional function of stabilizing the earthen channel left after removal of the existing pipe, preventing collapses or caveins of the channel.

As the back reaming bit rotates and moves laterally through the existing pipe, a pulling force is applied to the swivel connecting means at the trailing end of the back reaming bit; which in turn pulls upon the attaching means of the plug attached to the end of the replacement pipe. Thus, the replacement pipe is pulled into and through the channel while the grinding process progresses. The back reaming bit, while moving laterally through the existing pipe, acts as a piston, forcing fluid, pulverized debris from the existing pipe, and soil or sand from the channel wall toward the drill stem insertion end of the existing pipe. The fluid, soil and debris emits as a sludge from the opening of the existing pipe into the drill stem insertion pit or manhole. The sludge may then be pumped out of the pit or removed manually for disposal elsewhere. At completion of the process, the back reaming bit emerges into the drill stem insertion pit or manhole, followed by the end of the replacement pipe. When the end of the replacement pipe emerges into the drill stem insertion pit or manhole, the pipe replacement operation is complete.

The replacement pipe typically is composed of any one of several plastic or polymer materials. Where a non-segmented plastic or polymer replacement pipe is to be installed, the pipe is laid out at ground level along the path of the existing pipe with the end of the replacement pipe lying over and flexibly bending downward into the replacement pipe insertion pit for attachment to the swivel connecting means of back reaming bit. Where a segmented replacement pipe is to be installed, the joints thereof may be fixedly connected by means of solvent welding, or by a temporary internal tension means such as a cable extending from the trailing end of the replacement pipe to its leading end. Fixed connection of the segments of a segmented replacement pipe allows such a pipe to be pulled into the pipe channel, much the same as a non-segmented replacement pipe.

The method of pipe replacement described above is not necessarily accomplished through a single pass of the back reaming bit through the channel of the existing pipe. While the final pass necessarily pulls the replacement pipe into and through the channel, any number of passages of a back reaming bit through the existing pipe may be performed prior to the final pass. Such additional passes may be utilized where successively larger back reaming bits progressively grind away the existing pipe. Back reaming is not necessarily performed on the final pass. Provided that the pipe channel has been sufficiently widened, a pulling means, preferably a drill stem pulled by the drilling unit, may be extended through the pipe channel and fixedly attached to the end of the replacement pipe. The replacement pipe is then pulled into and through the channel by the pulling means.

After a section of existing pipe is replaced, the pit, or manhole, at either end of the section may facilitate repetition of the process upon the next contiguous section of existing pipe to be replaced.

BRIEF DESCRIPTION OF THE DRAWINGS

The drawings appended hereto are submitted so that the features and objects of the invention briefly described above may be understood in further detail. Such drawings illustrate only typical embodiments of the invention, and are not to be construed or considered as limiting in scope. The invention may admit other equally effective embodiments.

IN THE DRAWINGS

DETAIL AND DESCRIPTION OF PREFERRED EMBODIMENT

Figure 1:
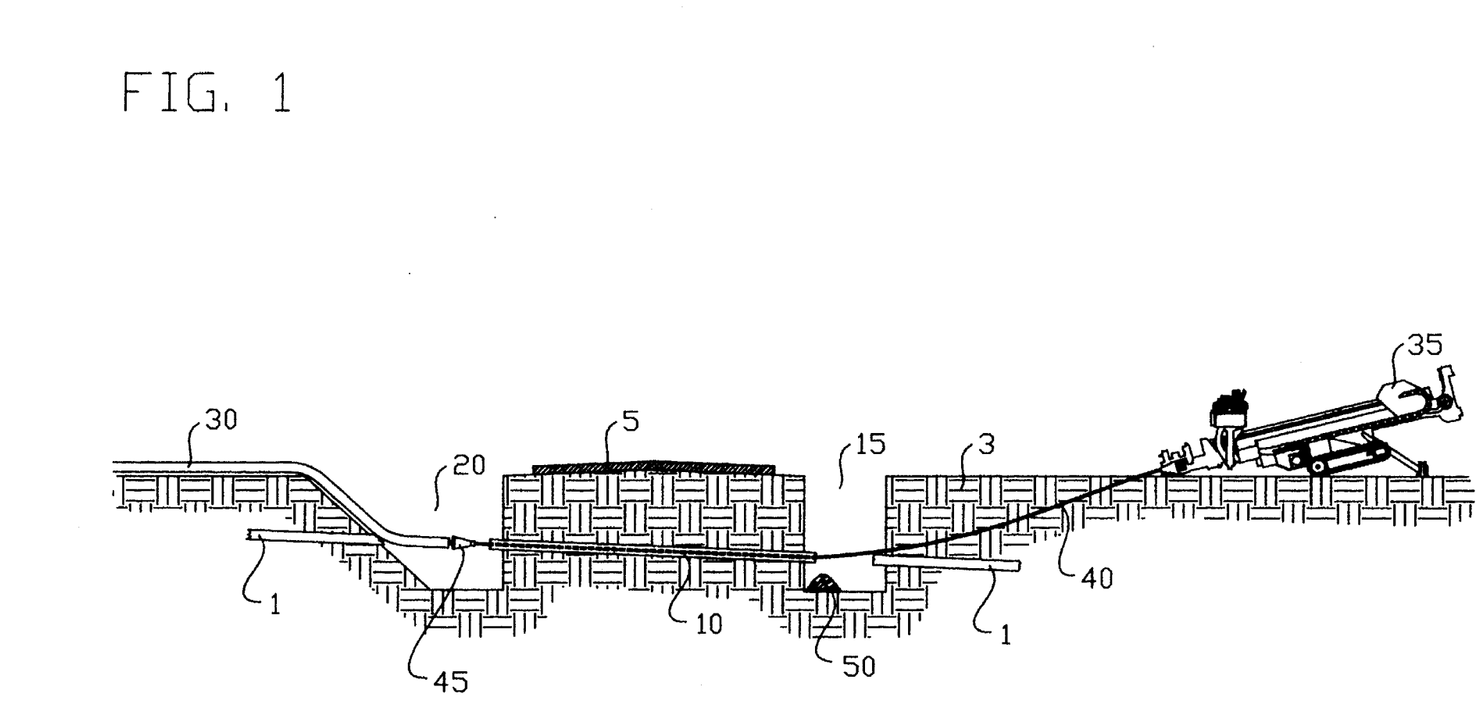
FIG. 1 is a sectional view depicting above ground and below ground articles and machines utilized in the method of this invention.

FIG. 1 depicts a paved road 5 overlying an existing sewer pipe 1, buried within the ground 3, which pipe is deteriorated and in need of replacement. The width of the paved road 5 defines the length and location of the removal segment 10 of the existing pipe 1 to which the method is applied. The slope or grade of the removal segment 10 is determined, and at its lower end a drill stem insertion pit 15 is excavated, cutting through and exposing the first end of the removal segment 10. Alternately, referring to FIG. 2, a pre-existing sewer pipe maintenance manhole 16 may take the place of the drill stem insertion pit 15. Referring to FIG. 1, at the second end of the removal segment 10, on the other side of the road 5, a replacement pipe insertion pit 20 is excavated, cutting through and exposing the second end of the removal segment 10. The wall of the replacement pipe insertion pit 20 facing the opening of the removal segment 10 is sloped away from the opening allowing a flexible replacement pipe 30 to be pulled downward therein.

Figure 2:
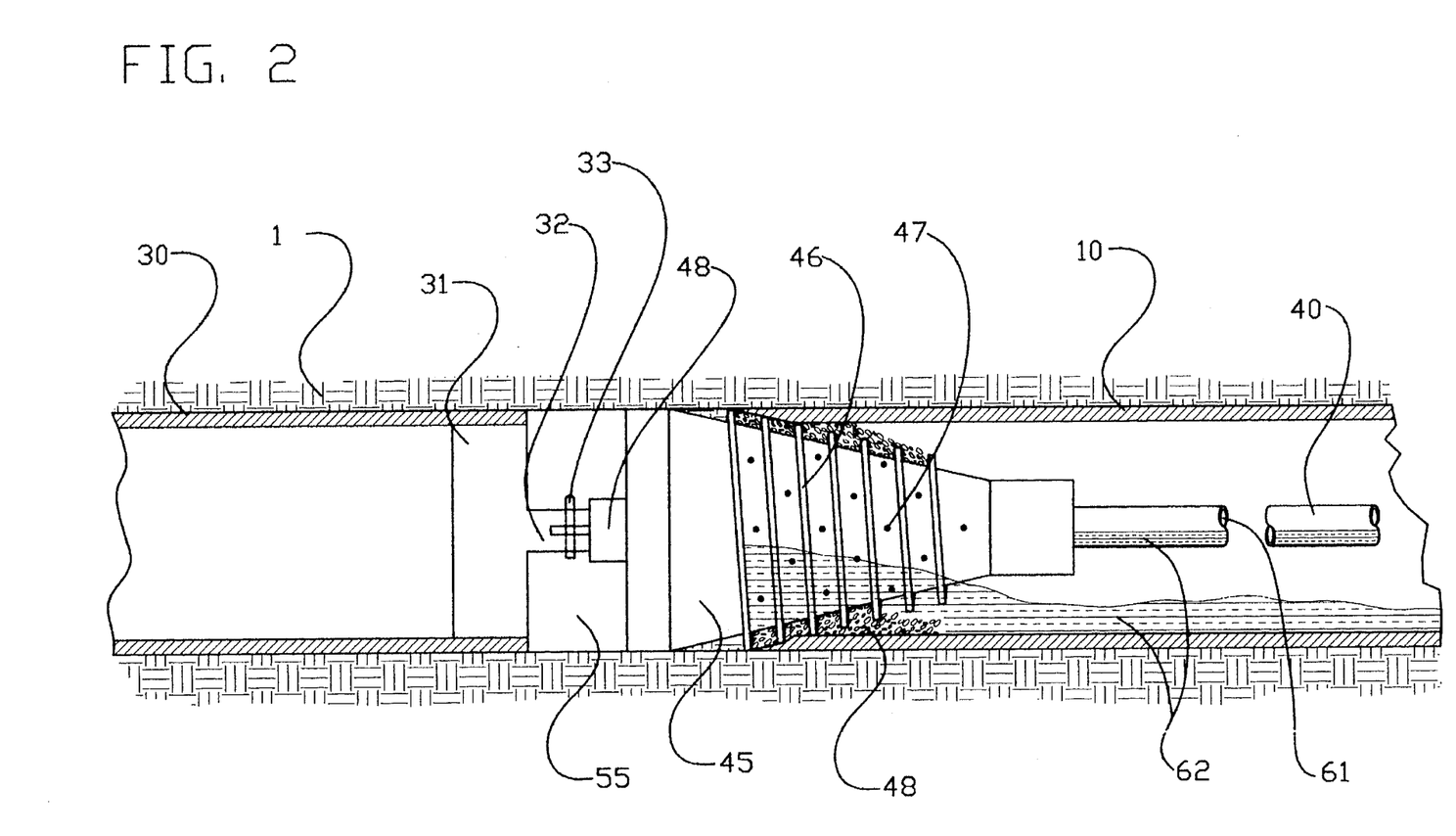
FIG. 2 is an alternate partial sectional view wherein a manhole takes the place of a drill stem insertion pit.

A drilling unit 35 of the type typically used with directional boring systems is positioned at ground level above the existing pipe 1, and at a point laterally and outwardly removed from the first end of the removal segment 10 such that the angle between the ground level and a line extending from the drilling unit 35 to the first end of the removal segment 10 is approximately 30°. The drilling unit 35 is then operated to drive, bore, and guide a flexible hollow drill stem 40 downward through the earth in an arced path calculated to cause the end of the drill stem to enter and traverse the drill stem insertion pit 15. Referring to FIG. 2, where a manhole 16 takes the place of the drill stem insertion pit 15, an aperture 17 is broken or cut through the wall of the manhole 16 to allow passage of the drill stem 40. Upon passage of the end of the drill stem 40 into open space of the drill stem insertion pit 15 or the manhole 16, the drilling unit 35 is operated to extend the end of the drill stem 40 into the opening of the first and of the removal segment 10.

Figure 3:
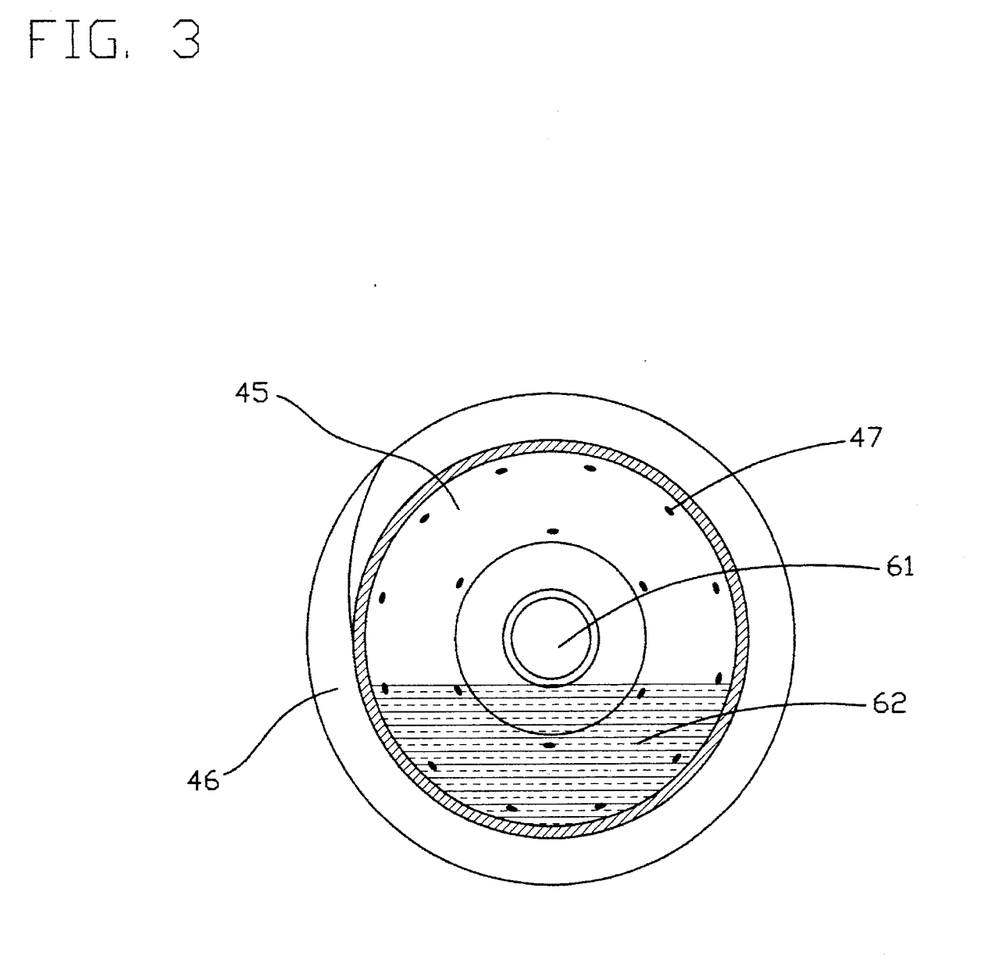
FIG. 3 depicts the back reaming bit connected to the drill stem, while in the process of grinding away an existing pipe and simultaneously towing a replacement pipe.
Figure 4:
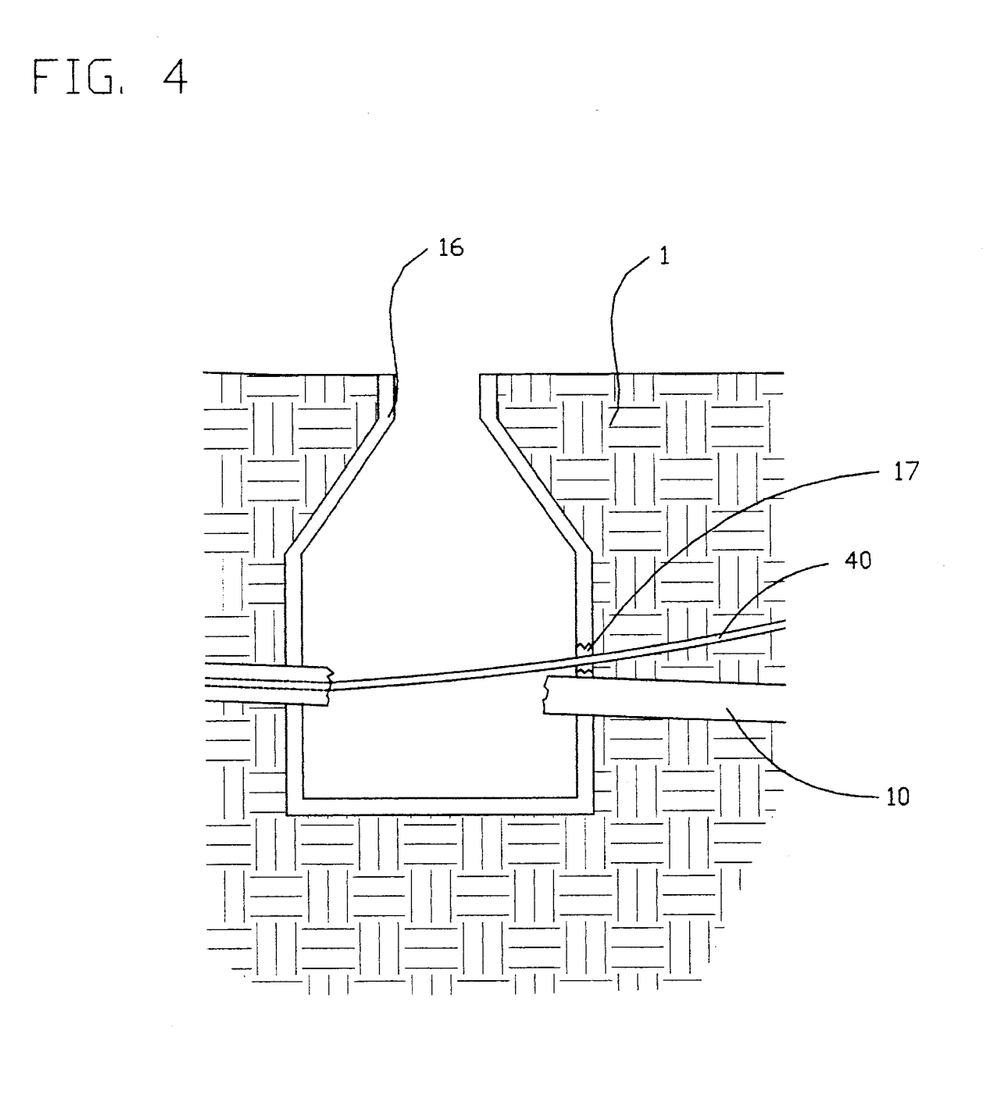
FIG. 4 is a cross-sectional view of the back reaming bit, the sectional plane being perpendicular to the axis of rotation thereof and intersecting the internal chamber thereof.

Referring again to FIG. 1, upon insertion of the end of the drill stem 40 into the opening of the first end of the removal segment 10, the drilling unit 35 is operated to further extend the drill stem through the channel of removal section 10, causing the end of the drill stem 40 to protrude from the second end of the removal segment 10 into the replacement pipe insertion pit 20. A back reaming bit 45 is then fixedly attached to the end of the drill stem 40. Referring to FIG. 3, the leading end of the back reaming bit 45 is conical, having a helical cutting blade 46 on its outer periphery. The back reaming bit also has a swivel connecting means 48 fixedly attached to the trailing end thereof. Referring to FIG. 4, the back reaming bit 45 has a hollow interior chamber 60 whose open space is continuous with a hollow fluid assist channel 61 which, referring to FIG. 3, lies within the drill stem 40. Referring to FIG. 3 and FIG. 4, the back reaming bit 45 has a plurality of fluid assist apertures 47 for emission of fluid 62 from the back reaming bit.

Referring to FIG. 1, a flexible replacement pipe 30 composed of a plastic or polymer material is positioned at ground level in approximate alignment with the path of the existing pipe 1. The end of the replacement pipe 30 is flexibly pulled downward into the replacement pipe insertion pit 20. Referring to FIG. 3, the replacement pipe 30 has a plug 31 fixedly attached to and occlusively sealing the bore of the replacement pipe 30; the plug 31 having an attaching means 32 adapted for fixed attachment to the swivel connecting means 48 of the back reaming bit 45. Referring to FIG. 1, within the replacement pipe insertion pit 20 the end of the replacement pipe 30 is guided to cause, referring to FIG. 3, the attaching means 32 of the plug 31 to come into close proximity with the swivel connecting means 48 of the back reaming bit 45. The attaching means 32 is then fixedly attached to the swivel connecting means 48, by means such as a pin 33.

Referring to FIG. 1, the drilling unit 35 is then operated to apply a pulling force to the drill stem 40, which in turn pulls the back reaming bit 45 laterally into the opening of the second end of the removal segment 10. Simultaneously with applying such pulling force, the drilling unit 35 is operated to apply rotational torque to the drill stem 40 causing the back reaming bit 45 to rotate. Referring to FIG. 3, the lateral pulling force and rotational torque transmitted through the drill stem 40 to the back reaming bit 45 causes the helical cutting blade 46 to grind the removal segment 10 into a pulverized debris 48.

Simultaneously with grinding of the removal segment 10, the drilling unit is operated to perform a fluid assist wherein a fluid 62 preferably composed of water, a polymer lubricant and, optionally, bentonite is pumped by the drilling unit 35 into the end of the drill stem 40 which is opposite the back reaming bit 45. Referring to FIGS. 3 and 4, such pumping causes the fluid 62 to pass through the fluid assist channel 61. The fluid 62 then emits from the fluid assist channel 61 into the hollow back reaming bit chamber 60. The fluid further emits from the fluid assist apertures 47 into the channel of the removal segment 10. Referring to FIG. 3, fluid 62 emitted from the fluid assist apertures 47 of the back reaming bit 45 serves the function of lubricating the grinding process and lubricating the earthen channel 55 rearward of the back reaming bit 45, reducing friction upon the replacement pipe 30. If the fluid 62 is comprised of bentonite, such fluid serves the further function of stabilizing the earthen channel 55, preventing cave ins. The fluid 62 serves the further function of washing pulverized debris 48 toward the first end of the removal segment resulting in removal of the replacement segment 10 from the channel 55. Referring to FIG. 1 and FIG. 3, pulverized debris 48 and fluid 62 emitted from the back reaming bit 45 which is washed down the channel of the removal segment 10 is deposited as a sludge 50 on the floor of the drill stem insertion pit 15 or referring to FIG. 2 on the floor of the manhole 16, as the case may be.

Referring to FIG. 3, the grinding operation of the back reaming bit 45 creates a pipe channel 55 of a diameter sufficient to allow the replacement pipe 30 to be simultaneously slidably pulled therethrough. The process of grinding away the removal segment 10 and simultaneously drawing the replacement pipe 30 into the pipe channel 55 continues until the back reaming bit 45 and the end of the replacement pipe 30 emerge from the opening at the first end of the removal segment 10. Upon emergence of the end of the replacement pipe 30 from the opening at the first end of the removal segment 10, the pipe replacement process for that segment is complete.

In view of the foregoing, it is evident that the present invention is one well adapted to obtain all of the objects and features hereinabove set forth together with other objects and features that are inherent from the method described hereinabove.

While the foregoing is directed to the preferred embodiment, the scope thereof is determined by the claims which follow.

What is claimed is:

1. A method of replacing an existing pipe with a replacement pipe; the existing pipe having a first end and a second end; the existing pipe being buried within the ground; the interior surface of the existing pipe initially defining a replacement pipe channel; the replacement pipe channel having a first end and a second end corresponding to the first and second ends of the existing pipe; the existing pipe and the ground surrounding the existing pipe comprising a solid matter surrounding the radial periphery of the replacement pipe channel; and the exterior diameter of the replacement pipe being greater than the interior diameter of the existing pipe; said method comprising the steps of:

(A) positioning a drilling unit of the type typically used with directional boring systems, the drilling unit having and being capable of driving, pulling, rotating, and guiding a drill stem, the drill stem having a first end and a second end, such positioning allowing the first end of the drill stem to be driven and guided by the drilling unit into close proximity with the first end of the replacement pipe channel;

(B) operating the drilling unit to drive and guide the first end of the drill stem into close proximity with the first end of the replacement pipe channel;

(C) operating the drilling unit to extend the first end of the drill stem into the first end of the replacement pipe channel and through said channel to protrude from its second end;

(D) fixedly attaching to the drill stem a back reaming bit for grinding and pulverizing the existing pipe, the back reaming bit having a leading end and a trailing end, the leading end of the back reaming bit being fixedly attached to the first end of the drill stem, the back reaming bit having fixedly attached to its trailing end a swivel connecting means, and the back reaming bit having a diameter greater than or equal to the diameter of the replacement pipe;

(E) fixedly attaching an end of the replacement pipe to the swivel connecting means of the back reaming bit;

(F) operating the drilling unit to rotate and pull the drill stem, causing the back reaming bit to rotate and move laterally into the second end of the replacement pipe channel and through said channel, causing a portion of the solid matter surrounding said channel to be ground into a pulverized debris, and simultaneously pulling the replacement pipe into and through the replacement pipe channel.

2. A method of replacing an existing pipe with a replacement pipe; the existing pipe having a first end and a second end; the existing pipe being buried within the ground; the interior surface of the existing pipe initially defining a replacement pipe channel, the replacement pipe channel having a first end and a second end corresponding to the first and second ends of the existing pipe; the existing pipe and the ground surrounding the existing pipe comprising a solid matter surrounding the radial periphery of the replacement pipe channel; and the exterior diameter of the replacement pipe being greater than the interior diameter of the existing pipe; said method comprising the steps of:

(A) positioning a drilling unit of the type typically used with directional boring systems, the drilling unit having and being capable of driving, pulling, rotating, and guiding a drill stem, the drill stem having a first end and a second end, such positioning allowing the first end of the drill stem to be driven and guided by the drilling unit into close proximity with the first end of the replacement pipe channel;

(B) operating the drilling unit to drive and guide the first end of the drill stem into close proximity with the first end of the replacement pipe channel;

(C) operating the drilling unit to extend the first end of the drill stem into the first end of the replacement pipe channel and through said channel to protrude from its second end;

(D) performing a series of one or more back reaming operations, each back reaming operation comprising the steps of fixedly attaching to the first end of the drill stem a back reaming bit for grinding and pulverizing the existing pipe, the back reaming bit having a leading end and a trailing end, the leading end thereof being attached to the first end of the drill stem, and the back reaming bit having a diameter greater than the diameter of the replacement pipe channel; operating the directional drill to pull and rotate the drill stem causing the back reaming bit to rotate and to move laterally into and through the replacement pipe channel, causing a portion of the solid matter surrounding said channel to be ground into a pulverant debris, and causing the back reaming bit to emerge from the first end of the replacement pipe channel; detaching the back reaming bit; and operating the drilling unit to extend the first end of the drill stem into the first end of the replacement pipe channel, and through said channel to protrude from its second end; the performance of said series of back reaming operations causing the replacement pipe channel to be widened in increments;

(E) fixedly attaching to the drill stem a back reaming bit for grinding and pulverizing the existing pipe, the back reaming bit having a leading end and a trailing end, the leading end of the back reaming bit being attached to the first end of the drill stem, the back reaming bit having fixedly attached to its trailing end a swivel connecting means, and the back reaming bit having a diameter greater than the diameter of the replacement pipe channel and greater than or equal to the diameter of the replacement pipe;

(F) fixedly attaching an end of the replacement pipe to the swivel connecting means of the back reaming bit;

(G) operating the drilling unit to rotate and pull the drill stem, causing the back reaming bit to rotate and to move laterally into and through the replacement pipe channel, causing a portion of the solid matter surrounding the replacement pipe channel to be ground into a pulverized debris, and simultaneously pulling the replacement pipe into and through the replacement pipe channel.

3. A method of replacing an existing pipe with a replacement pipe, the existing pipe having a first end and a second end, the existing pipe being buried within the ground; the interior surface of the existing pipe initially defining a replacement pipe channel, the replacement pipe channel having a first end and a second end corresponding to the first and second ends of the existing pipe; the existing pipe and the ground surrounding the existing pipe comprising a solid matter surrounding the radial periphery of the replacement pipe channel; and the exterior diameter of the replacement pipe being greater than the interior diameter of the existing pipe; said method comprising the steps of:

(A) positioning a drilling unit of the type typically used with directional boring systems, the drilling unit having and being capable of driving, pulling, rotating, and guiding a drill stem, the drill stem having a first end and a second end, such positioning allowing the first end of the drill stem to be driven and guided by the drilling unit into close proximity with the first end of the replacement pipe channel;

(B) operating the drilling unit to drive and guide the first end of the drill stem into close proximity with the first end of the replacement pipe channel;

(C) performing a series of one or more back reaming operations, each back reaming operation comprising the steps of operating the drilling unit to extend the first end of the drill stem into the first end of the replacement pipe channel, and through said channel to protrude from its second end; fixedly attaching to the drill stem a back reaming bit for grinding and pulverizing the existing pipe, the back reaming bit having a leading end and a trailing end, the leading end of the back reaming bit being attached to the first end of the drill stem, and the back reaming bit having a diameter greater than the diameter of the replacement pipe channel; operating the drilling unit to pull and rotate the drill stem, causing the back reaming bit to rotate and move laterally into and through the replacement pipe channel, causing a portion of the solid matter surrounding said channel to be ground into a pulverized debris, and causing the back reaming bit to emerge from the first end of the replacement pipe channel; and detaching the back reaming bit; the performance of said series of back reaming operations being terminated when the diameter of the replacement pipe channel is greater than or equal to the diameter of the replacement pipe;

(D) extending a pulling means into the first end of the replacement pipe channel and through said channel to protrude from its second end;

(E) fixedly attaching said pulling means to an end of the replacement pipe; and, (F) pulling the replacement pipe by said pulling means into and through the replacement pipe channel.

4. The method of claim No. 3, wherein the step of extending the pulling means comprises operation of the drilling unit to extend a drill stem into and through the replacement pipe channel, and wherein the step of pulling the replacement pipe comprises operation of the drilling unit to pull the replacement pipe into and through the replacement pipe channel.

5. The method of claim No. 1, claim No. 2, or claim No. 3, wherein the drill stem has a fluid assist channel therethrough, the fluid assist channel having a first end and a second end corresponding with the first and second ends of the drill stem; wherein the drilling unit is further capable of performing a fluid assist, wherein a fluid is pumped by the drilling unit into the second end of the fluid assist channel; wherein at least one back reaming bit used therein has a hollow interior back reaming bit chamber forming a continuous passage for the flow of the fluid from the fluid assist channel into the back reaming bit chamber, each such back reaming bits having a plurality of fluid assist apertures for emission of the fluid from the back reaming bit chamber into the replacement pipe channel; and further comprising the step of operating the drilling unit to perform a fluid assist, causing the fluid to flow through the fluid assist channel, into the back reaming bit chamber, and to emit from the fluid assist apertures, thereby lubricating the back reaming bit and the wall of the replacement pipe channel, and washing the pulverized debris toward the first end of the replacement pipe channel; said fluid assist being performed during at least one passage of the back reaming bit through the replacement pipe channel.

6. The method of claim No. 5 further comprising the step of adding a polymer lubricant to the fluid prior to operating the drilling unit to perform the fluid assist.

7. The method of claim No. 6 further comprising the step of adding bentonite to the fluid prior to operating the drilling unit to perform the fluid assist.

8. The method of claim No. 1, claim No. 2, or claim No. 3, wherein the step of fixedly attaching the back reaming bit further comprises selection and attachment of a back reaming bit further having a helical cutting blade fixedly attached to its outer periphery.

9. The method of claim No. 1, claim No. 2, or claim No. 3, further comprising the step of fixedly attaching a plug to the end of the replacement pipe which is pulled into the second end of the replacement pipe channel, the plug having an attaching means fixedly attached thereto by which the plug and attached replacement pipe may be pulled into and through the replacement pipe channel, said step being performed prior to the step of pulling the replacement pipe through the replacement pipe channel.

* * * * *

UNITED STATES PATENT AND TRADEMARK OFFICE
CERTIFICATE OF CORRECTION

PATENT NO.    : 5,580,188
DATED         : December 3, 1996
INVENTOR(S)   : Nowak It is certified that error appears in the above-identified patent and that said Letters Patent is hereby corrected as shown below:

The title page, showing the illustrative figure, should be deleted and substitute therefore the attached title page.

The drawing sheets consisting of Figs 2-4, should be deleted to be replaced with the drawing sheets, consisting of Figure 2-4, as shown on the attached pages.

Signed and Sealed this

Twenty-sixth Day of August, 2003

JAMES E. ROGAN
*Director of the United States Patent and Trademark Office*

United States Patent [19]

Nowak

[11] Patent Number: 5,580,188

[45] Date of Patent: Dec. 3, 1996

[54] METHOD FOR REPLACING BURIED PIPE

[75] Inventor: John G. Nowak, Goddard, Kans.

[73] Assignee: Nowak Construction Co., Inc., Goddard, Kans.

[21] Appl. No.: 503,272

[22] Filed: Jul. 17, 1995

[51] Int. Cl.$^6$ ........................................................ F16L 1/00
[52] U.S. Cl. ........................... 405/184; 405/154; 405/156
[58] Field of Search ...................................... 405/154, 156, 405/184, 157; 175/53, 62; 166/55–55.7; 15/104.2, 104.7, 104.13, 104.15, 104.16

[56] References Cited

U.S. PATENT DOCUMENTS

| | | | |
|---|---|---|---|
| 4,507,019 | 3/1985 | Thompson | 405/154 |
| 4,911,579 | 3/1990 | Lutz et al. | 405/154 X |
| 4,915,543 | 4/1990 | Akesaka | 405/154 X |
| 4,925,344 | 5/1990 | Peres | 405/154 X |
| 5,098,225 | 3/1992 | Rockower et al. | 405/184 X |
| 5,403,122 | 4/1995 | Granella | 405/154 X |

Primary Examiner—Dennis L. Taylor
Attorney, Agent, or Firm—Kenneth H. Jack

[57] ABSTRACT

A method of replacing an existing buried pipe with a replacement pipe comprising the steps of positioning a drilling unit of the type typically used with directional boring systems, at ground level over the pipe to be replaced, operating the drilling unit to drive and guide a hollow flexible drill stem through the earth and into an open end of the section of existing pipe to be replaced, further operating the drilling unit to extend the drill stem through the section of existing pipe to be replaced and to protrude from its other end, attaching to the leading end of the drill stem a conical back reaming bit, attaching to the trailing end of the back reaming bit a flexible replacement pipe, and operating the drilling unit drill to apply a pulling force to the drill stem and to apply rotational torque to the drill stem, causing the back reaming bit to be driven and rotated laterally into and through the existing pipe, grinding away the existing pipe, and causing the replacement pipe to be simultaneously pulled into and through the pipe channel.

9 Claims, 4 Drawing Sheets